(12) United States Patent
Kobayashi et al.

(10) Patent No.: US 7,992,445 B2
(45) Date of Patent: Aug. 9, 2011

(54) PRESSURE SENSOR

(75) Inventors: Mitsuru Kobayashi, Tsu (JP); Hiroshi Inoue, Mie (JP); Hitoshi Makinaga, Tsu (JP); Junji Imai, Amagasaki (JP); Yasufumi Masaki, Hirakata (JP); Naoto Ikegawa, Tsu (JP); Youichiro Nakahara, Tsu (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 12/441,620

(22) PCT Filed: Sep. 27, 2007

(86) PCT No.: PCT/JP2007/068837
§ 371 (c)(1),
(2), (4) Date: Mar. 17, 2009

(87) PCT Pub. No.: WO2008/041607
PCT Pub. Date: Apr. 10, 2008

(65) Prior Publication Data
US 2009/0266173 A1    Oct. 29, 2009

(30) Foreign Application Priority Data

Oct. 2, 2006  (JP) ................. 2006-270758
Oct. 5, 2006  (JP) ................. 2006-274178
Nov. 16, 2006  (JP) ................. 2006-310792
Dec. 22, 2006  (JP) ................. 2006-346538

(51) Int. Cl.
*G01L 9/12* (2006.01)

(52) U.S. Cl. .......................................... 73/724; 73/718

(58) Field of Classification Search .................. None
See application file for complete search history.

(56) References Cited

U.S. PATENT DOCUMENTS

| 4,562,742 A * | 1/1986 | Bell ........................... 73/718 |
| 5,852,337 A | 12/1998 | Takeuchi et al. |
| 5,859,759 A | 1/1999 | Moriyama et al. |
| 7,290,453 B2 * | 11/2007 | Brosh ........................... 73/720 |
| 2004/0012062 A1 | 1/2004 | Miyajima et al. |
| 2004/0194550 A1 | 10/2004 | Wakasugi et al. |
| 2006/0144153 A1 | 7/2006 | Brosh |
| 2007/0120272 A1 | 5/2007 | Nakagawa et al. |
| 2007/0176249 A1 | 8/2007 | Meshii et al. |
| 2008/0291784 A1 | 11/2008 | Yamanaka et al. |

FOREIGN PATENT DOCUMENTS

CH    1514219    7/2004

(Continued)

OTHER PUBLICATIONS

English language abstract of JP 2000-199725, Jul. 18, 2000.

(Continued)

*Primary Examiner* — Andre J Allen
(74) *Attorney, Agent, or Firm* — Greenblum & Bernstein, P.L.C.

(57) ABSTRACT

In a pressure sensor including a pressure detecting element in an intermediate portion or at a deep side of a through hole formed in a protrusion, a body portion (a base portion and the protrusion) is made of ceramic or an insulative resin material and molded into a predetermined shape, and the pressure sensor is constituted as a molded interconnect device in which a conductive pattern is formed on a surface thereof. Accordingly, a smaller pressure sensor can be obtained.

16 Claims, 14 Drawing Sheets

FOREIGN PATENT DOCUMENTS

| | | |
|---|---|---|
| CN | 1536343 | 10/2004 |
| EP | 0500945 | 9/1992 |
| JP | 61-80024 | 4/1986 |
| JP | 1-96523 | 4/1989 |
| JP | 4-95741 | 3/1992 |
| JP | 4-106441 | 4/1992 |
| JP | 6-323941 | 11/1994 |
| JP | 8-094468 | 4/1996 |
| JP | 09-184779 | 7/1997 |
| JP | 9-184779 | 7/1997 |
| JP | 10-104101 | 4/1998 |
| JP | 10-300604 | 11/1998 |
| JP | 11-26832 | 1/1999 |
| JP | 11-163412 | 6/1999 |
| JP | 11-326088 | 11/1999 |
| JP | 2000-91663 | 3/2000 |
| JP | 2000-199725 | 7/2000 |
| JP | 2001-311675 | 11/2001 |
| JP | 2003-130749 | 5/2003 |
| JP | 2003-133453 | 5/2003 |
| WO | 2006/001211 | 1/2006 |

OTHER PUBLICATIONS

English language abstract of JP 11-326088, Nov. 26, 1999.
English language abstract of JP 2001-311675, Nov. 9, 2001.
English language abstract of JP 2003-130749, May 8, 2003.
English language abstract of JP 10-104101, Apr. 24, 1998.
English language abstract of JP 2000-91663, Mar. 31, 2000.
English language abstract of JP 11-26832, Jan. 29, 1999.
English language abstract of JP 61-80024, Apr. 23, 1986.
English language abstract of JP 4-95741, Mar. 27, 1992.
English language abstract of JP 9-184779, Jul. 15, 1997.
English language abstract of JP 1-96523, Apr. 14, 1989.
English language abstract of JP 10-300604, Nov. 13, 1998.
English language abstract of JP 2003-133453, May 9, 2003.
English language abstract of JP 6-323941, Nov. 25, 1994.
English language abstract of JP 8-094468, Apr. 12, 1996.

* cited by examiner (a)

(b)

(a)

(b)

PRESSURE SENSOR

TECHNICAL FIELD

The present invention relates to a pressure sensor that detects a pressure of fluid.

BACKGROUND ART

There is conventionally known a pressure sensor having a sensor chip that closes one end of a through hole as a pressure introducing hole formed in a package body (for example, Patent Document 1).

According to a pressure sensor disclosed in Patent Document 1, a sensor chip is mounted on a resin package body through a glass pedestal by wire bonding. To secure desired detection accuracy, the glass pedestal has a function for reinforcing the package body to secure the desired detection accuracy of the sensor chip.

However, the conventional pressure sensor has a problem that because it includes the glass pedestal, the size and weight are increased correspondingly.

Because the sensor chip mounted by wire bonding, there are problems that the mounting operation becomes complicated, and it becomes necessary to form a space for carrying out the wire bonding, so that the pressure sensor is increased in size.

Therefore, an object of the present invention is to provide a smaller pressure sensor.

Patent Document 1: Japanese Patent Application Laid-open No. H10-300604

DISCLOSURE OF INVENTION

According to the present invention, in a pressure sensor having a pressure detecting element located to close a through hole formed in a body portion, the body portion is constituted as a molded interconnect device in which ceramic is molded into a predetermined shape and a conductive pattern is formed on a surface of the body portion.

According to the present invention, the pressure detecting element can be mounted on the body portion by flip-chip bonding.

According to the present invention, in a pressure sensor having a pressure detecting element located to close a through hole formed in a body portion, the body portion can be constituted as a molded interconnect device in which an insulative resin material is molded into a predetermined shape and a conductive pattern is formed on a surface of the body portion, and the pressure detecting element can be mounted on the body portion by flip-chip bonding.

According to the present invention, the pressure detecting element and another element that is different from the pressure detecting element can be mounted on the body portion substantially in parallel to and at a distance from each other.

According to the present invention, a recess having a bottom face and a step face can be formed in the body portion, the through hole can be formed such that it opens at the bottom face, the pressure detecting element can be mounted on the bottom face, and the another element can be mounted on the step face.

According to the present invention, a recess can be formed in the body portion, the through hole can be formed such that it opens at a bottom face of the recess, the pressure detecting element can be mounted on the bottom face, and the conductive pattern can be formed to connect an inner surface of the recess and a side wall surface of the body portion across an opening edge of the recess.

According to the present invention, the recess can be vacuum sealed.

According to the present invention, a flange portion protruding from an inner peripheral surface of the through hole toward a center of the through hole can be formed on the body portion, the pressure detecting element can be mounted on a surface of the flange portion on a side of a pressure introducing opening of the through hole, and the another element can be mounted on a surface of the flange portion opposite from the pressure introducing opening.

According to the present invention, a pressure sensor is made of an elastic material and formed using a technique of producing a molded interconnect device, the pressure sensor is formed with a pressure introducing hole through which fluid to be detected is introduced, and the pressure detector includes a body portion formed with a thin film portion at a bottom of the pressure introducing hole, and a pressure detector that converts, into an electric signal, deformation of the thin film portion formed on a surface of the body portion and generated according to pressure variation.

According to the present invention, the pressure detector can include a first electrode pattern and a second electrode pattern formed on the surface of the thin film portion opposite from the pressure introducing hole, the first electrode pattern and the second electrode pattern being opposed to each other at a distance from each other, and the pressure detector can detect pressure variation as capacitance variation between the electrode patterns.

According to the present invention, a circuit pattern can be formed on a surface of the body portion where both the electrode patterns are formed, the circuit pattern being electrically connected to the electrode patterns.

According to the present invention, the body portion can include a pressure introducing tube having the pressure introducing hole, and a projection, which elastically comes into contact with an inner surface of a detection tube into which the pressure introducing tube is inserted, can be formed on an outer surface of the pressure introducing tube, thereby sealing a gap between the inner surface of the detection tube and the outer surface of the pressure introducing tube.

According to the present invention, pressure sensor comprising a body portion constituted as a molded interconnect device and including a thin diaphragm which is bent upon reception of a pressure of fluid, a pressure detector that is formed on a surface of the diaphragm where no fluid comes into contact and that converts bending generated in the diaphragm into an electric signal, and a signal processing circuit that is mounted on the body portion, that is connected to the pressure detector through a conductive pattern formed on the body portion, and that processes the electric signal received from the pressure detector through the conductive pattern.

According to the present invention, the pressure detector can include a dielectric film formed on the diaphragm surface, and an electrode formed on the dielectric film.

According to the present invention, the dielectric film can be formed of a piezoelectric body.

According to the present invention, the body portion can include a fitting portion that is cylindrical in shape surrounding a diaphragm surface with which fluid comes into contact, and that is fitted to a tube in which fluid is present.

According to the present invention, the fitting portion can be cylindrical in shape, and a screw thread can be formed on its outer peripheral surface.

BEST MODE FOR CARRYING OUT THE INVENTION

First Embodiment

Figure 1:
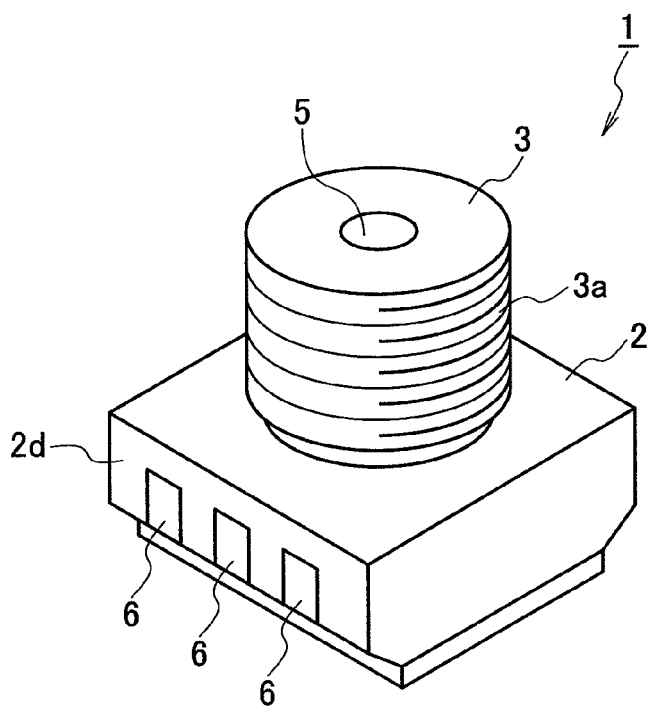
FIG. 1 is a perspective view of a pressure sensor according to an embodiment of the present invention.
Figure 2:
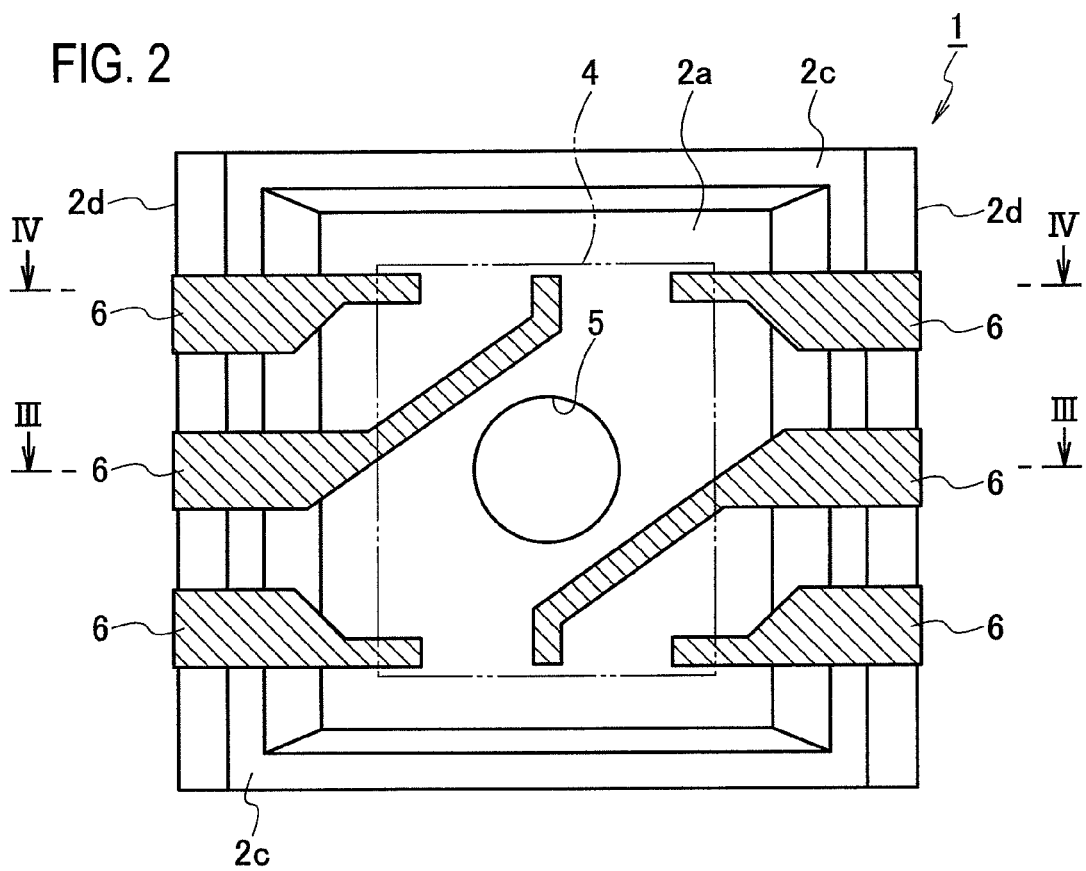
FIG. 2 is a plan view of the pressure sensor according to a first embodiment of the invention as viewed from its back side (opposite side from a detection side by a pressure detecting element).
Figure 3:
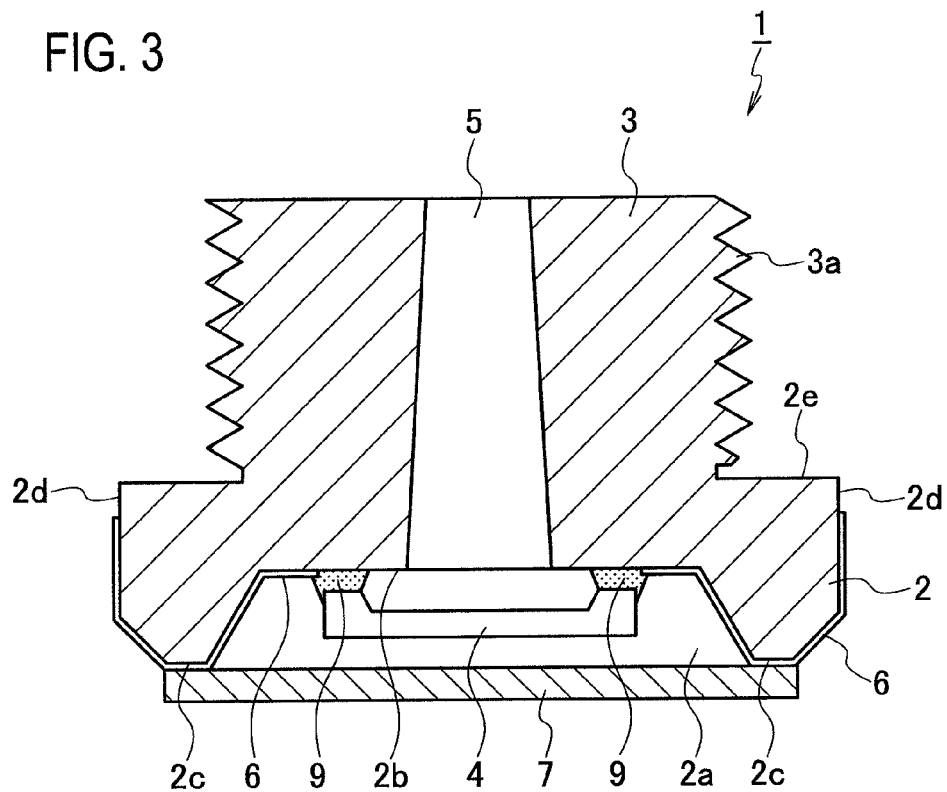
FIG. 3 is a sectional view taken along the line III-III in FIG. 2.
Figure 4:
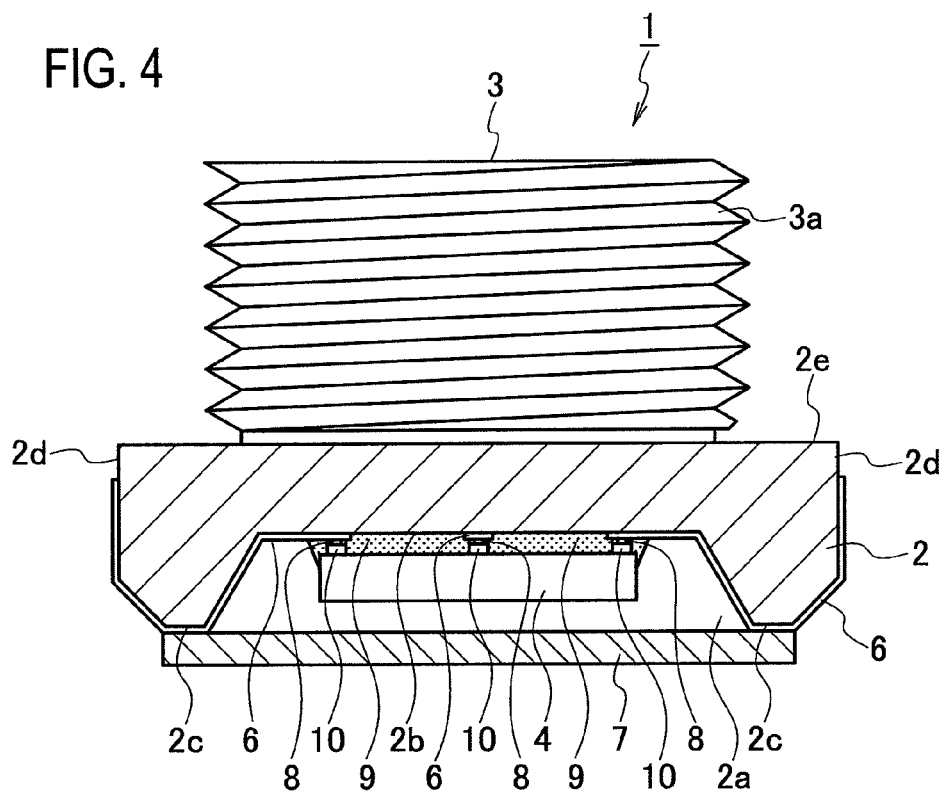
FIG. 4 is a sectional view taken along the line IV-IV in FIG. 2.
Figure 5:
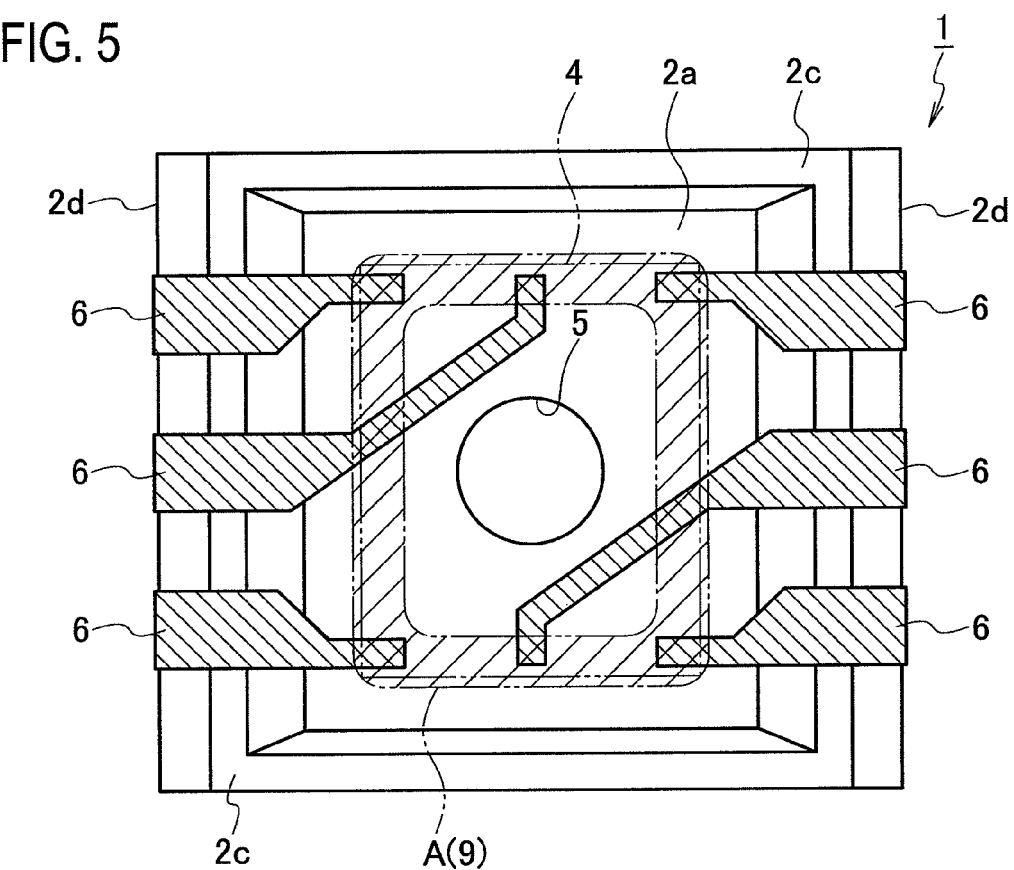
FIG. 5 is a plan view of the pressure sensor according to the first embodiment of the present invention as viewed from its back side, and showing a sealing region of the pressure detecting element by a sealing agent.
Figure 6:
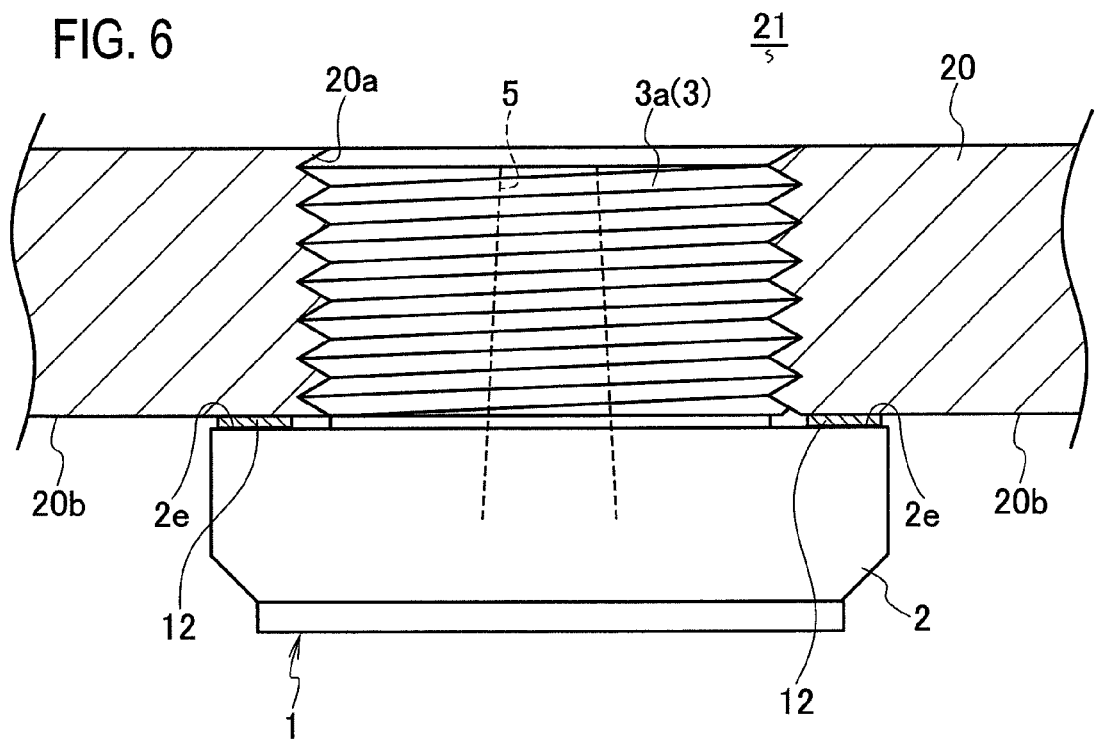
FIG. 6 is a side view (partial sectional view) showing a state where the pressure sensor according to the first embodiment of the present invention is mounted.

FIG. 1 is a perspective view of a pressure sensor according to a first embodiment of the present invention, FIG. 2 is a plan view of a pressure sensor as viewed from its back side (opposite side from a detection side by a pressure detecting element), FIG. 3 is a sectional view taken along the line III-III in FIG. 2, FIG. 4 is a sectional view taken along the line IV-IV in FIG. 2, FIG. 5 is a plan view of the pressure sensor as viewed from its back side and showing a sealing region of the pressure detecting element by a sealing agent, and FIG. 6 is a side view showing a state where the pressure sensor is mounted.

A pressure sensor 1 according to the present embodiment includes a substantially-cylindrical protrusion 3 provided on a flat surface (seal surface) 2e of a base portion 2 having a substantially rectangular parallelepiped appearance. In the present embodiment, the base portion 2 and the protrusion 3 correspond to a body portion.

The body portion (the base portion 2 and the protrusion 3) is constituted as a molded interconnect device (MID). In the present embodiment, the body portion can be obtained by various known techniques for MID (e.g., a one-shot process such as a UV exposure method (a subtractive method, a semi-additive method, and an additive method), a laser imaging method, and an IVOND method, and a two-shot process such as a SKW method) such that a ceramic material is formed into a predetermined shape by injection molding, for example, and a surface thereof is formed with a conductive pattern 6.

This body portion can be formed by ceramic injection molding (a powder injection molding method using ceramic powder as a raw material; CIM). More specifically, a binder (a low molecular component such as wax, a high molecular component such as thermoplastic resin, and other components are mixed at an appropriate ratio for charge flowability into a mold and shaping) is mixed into ceramic powder, a so-called green compact is formed by an injection molding machine having a mold, a degreasing operation for removing the binder is then carried out, the powder is thermally processed at a temperature equal to or lower than the melting point, and a product having a predetermined shape is obtained by sintering by which powder particles are bonded. In this case, it is necessary that the binder can form the molding material, and the binder can be decomposed and volatilized when being overheated and degreased. An example of the binder is one having 60% of polystyrene (% by mass), 20% of paraffin wax, and 20% of stearic acid. It is preferable that an amount of the binder to be used is about in a range of 15% to 25% (% by mass) with respect to 100% of ceramic powder, for example. When silica or zirconia is mixed to the ceramic powder, toughness can be enhanced.

The body portion can be formed by compression molding (press molding) of ceramic. In this case, a binder having 100% of acrylic polymer (% by mass) or 100% of PVA (polyvinyl alcohol) can be used, for example. It is preferable that an amount of the binder to be used be about 4% to 6% (% by mass) with respect to 100% of ceramic powder.

The body portion can be obtained by molding an insulative resin material (various engineering plastic such as polyamide and polyphthalamide) as a basic material into a predetermined shape by injection molding for example, and by forming the conductive pattern 6 on a surface thereof by means of the various known methods for MID (e.g., the one-shot process such as the UV exposure method (the subtractive method, the semi-additive method, the additive method and the like), the laser imaging method, and the IVOND method, and the two-shot process such as the SKW method).

As shown in FIG. 3, a through hole 5 is formed at the center of the protrusion 3 such that the hole penetrates in the axial direction of the protrusion 3, and a mounting male thread 3a is formed around an outer periphery of the protrusion 3.

As shown in FIGS. 3 and 4, a recess 2a is formed on the base portion 2 on the opposite side from the protrusion 3. The recess 2a is substantially rectangular in a planar view. The through hole 5 formed in the protrusion 3 opens at a substantially central portion of a bottom face 2b of the recess 2a.

As shown in FIGS. 3 to 5, a pressure detecting element 4 is mounted in a state where the opening end of the through hole 5 on the bottom face 2b (one end of the through hole 5 in the extending direction) is closed. The pressure detecting element 4 is obtained by forming a pressure receiving face on one surface of a monocrystal silicon substrate. The pressure detecting element 4 includes a diaphragm, a strain gauge, an electrode, and the like (not shown), and converts a pressure into an electric resistance by a piezoresistance effect. The through hole 5 corresponds to a pressure introducing hole.

In the present embodiment, as shown in FIG. 4, the pressure detecting element 4 is mounted on the conductive pattern 6 formed on the bottom face 2b by flip-chip bonding. In the drawing, reference numeral 8 denotes a conductive adhesive, 9 denotes an underfill (resin insulative adhesive), and 10 denotes a bump of each electrode of the pressure detecting element 4.

In this case, as shown with A in FIG. 5, the underfill 9 is arranged substantially in a form of rectangular ring along an outer edge of the pressure detecting element 4. The underfill 9 and the pressure detecting element 4 prevents fluid (liquid or gas) to be detected from entering (leaking out) from the through hole 5 into the recess 2a. That is, the underfill 9 also functions as a sealing member. When a high heat radiation material (e.g., silicon-based resin material) is used for the underfill 9, heat resistance of the pressure sensor 1 can be increased, and detection errors caused by a temperature of the pressure detecting element 4 can be suppressed.

The conductive pattern 6 can be appropriately formed using various processing such as physical vapor deposition, removal of unnecessary portions by irradiation of electromagnetic waves such as laser, and a pressurizing operation of films by electorolytic plating.

As shown in FIGS. 2 to 5, the conductive pattern 6 is formed to connect an inner surface of the recess 2a and a side wall 2d of the body portion (the base portion 2) across an opening edge 2c of the recess 2a. Therefore, a detection result of the pressure detecting element 4 can easily be obtained by establishing conduction with the conductive pattern 6 exposed on the side wall 2d.

The recess 2a is closed with a flat lid 7 on the opposite side from the protrusion 3. After the pressure detecting element 4 is mounted while securing the seal by the underfill 9 as described above, the closing operation by the lid 7 is carried out in a vacuum chamber, so that the recess 2a can be vacuum sealed. In this case, an absolute pressure can be detected by the pressure detecting element 4. When the vacuum sealing is not carried out, a pressure (gauge pressure) relative to the atmospheric pressure is detected.

The pressure sensor 1 having the above configuration can be mounted in a state as shown in FIG. 6, for example. That is, in this example, a female thread hole 20a corresponding to the male thread 3a of the protrusion 3 is formed on a division wall 20 (e.g., tube wall) in a region where fluid to be detected is present, and the protrusion 3 is threadedly engaged with the female thread hole 20a so that an annular seal member 12 (a washer, a gasket, an O-ring and the like) is sandwiched between a surface 20b of the division wall 20 and a flat surface 2e of the base portion 2 on the side where the protrusion 3 is formed. Accordingly, sealing of fluid is secured by the seal member 12.

According to the present embodiment, because the body portion (the base portion 2 and the protrusion 3) is made of ceramic, it becomes easy to secure rigidity and strength by the body portion itself and to secure desired detection accuracy of the pressure detecting element 4 even if a glass pedestal is not provided.

According to the present embodiment, because the pressure detecting element 4 is mounted on the body portion by the flip-chip bonding, producing labor can be reduced as compared with a case where the pressure detecting element 4 is mounted by wire bonding, takt time can be shortened and producing cost can be reduced.

According to the present embodiment, potential of each electrode of the pressure detecting element 4 can easily be taken out from the side wall 2d of the body portion by the conductive pattern 6 lying across the opening edge 2c of the recess 2a.

In the present embodiment, when the recess 2a on the opposite side (back surface side) from the detection side of the pressure detecting element 4 is vacuum sealed, the absolute pressure can be measured.

When the body portion is constituted as a molded interconnect device made of resin, it becomes easy to obtain a fine conductive pattern 6.

Second Embodiment

Figure 7:
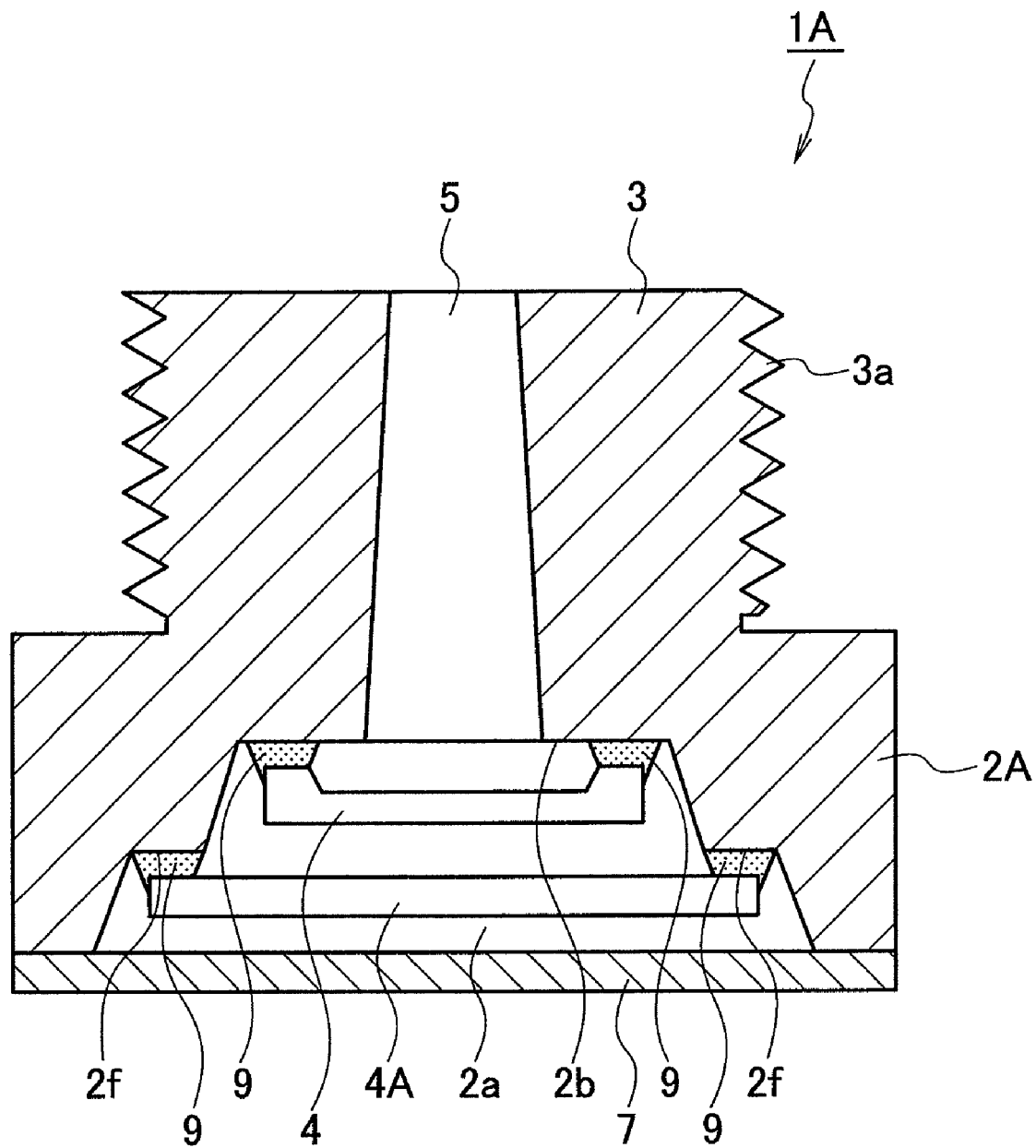
FIG. 7 is a vertical sectional view of a pressure sensor according to a second embodiment of the present invention.

FIG. 7 is a vertical sectional view of a pressure sensor according to a second embodiment of the present invention (corresponding to the sectional view of FIG. 3). A pressure sensor 1A according to the present embodiment includes same constituent elements as those of the pressure sensor 1 according to the first embodiment. Therefore, same constituent elements are denoted by common reference numerals, and redundant explanations thereof will be omitted.

In the present embodiment, a stepped recess 2a having the bottom face 2b and a step face 2f formed substantially at a central portion in a depth direction of a stepped recess 2a is formed on the base portion 2A. The pressure detecting element 4 is mounted on the bottom face 2b, and another element that is different from the pressure detecting element 4 (i.e., an element including a circuit that processes (i.e., filters, corrects, calculates, temperature compensates) a signal output from the pressure detecting element 4) is mounted on the step face 2f. Except these, the pressure sensor 1A has the same configuration as the pressure sensor 1 according to the first embodiment. Although not shown in FIG. 7, a conductive pattern like the conductive pattern 6 shown in FIGS. 2 to 5 is formed also on the surface of the recess 2a.

According to this configuration, the pressure detecting element 4 and the other element 4A are mounted on the base portion 2A at a distance from each other substantially in parallel to each other, utilizing the bottom face 2b and the step face 2f of the stepped recess 2a. With this configuration, a plurality of elements 4 and 4A can efficiently be collected in one pressure sensor 1A. Thus, a circuit including the elements 4 and 4A can be constituted more compactly.

The pressure detecting element 4 and the other element 4A can be mounted in multiple steps, and thus the pressure sensor 1A having the other element 4A can be constituted more compactly.

Although the mounting male thread is formed on the protrusion in the first and second embodiments, a mounting female thread can be formed on an inner peripheral surface of the through hole instead. The protrusion can be tapered.

An outer surface of the body portion can be coated with a magnetic material or a conductive material (e.g., composite plating of carbon nanotube and nickel). With this configuration, the influence (occurrence of detection errors or noise contamination) caused by electromagnetic waves from outside can be suppressed.

Third Embodiment

Figure 8:
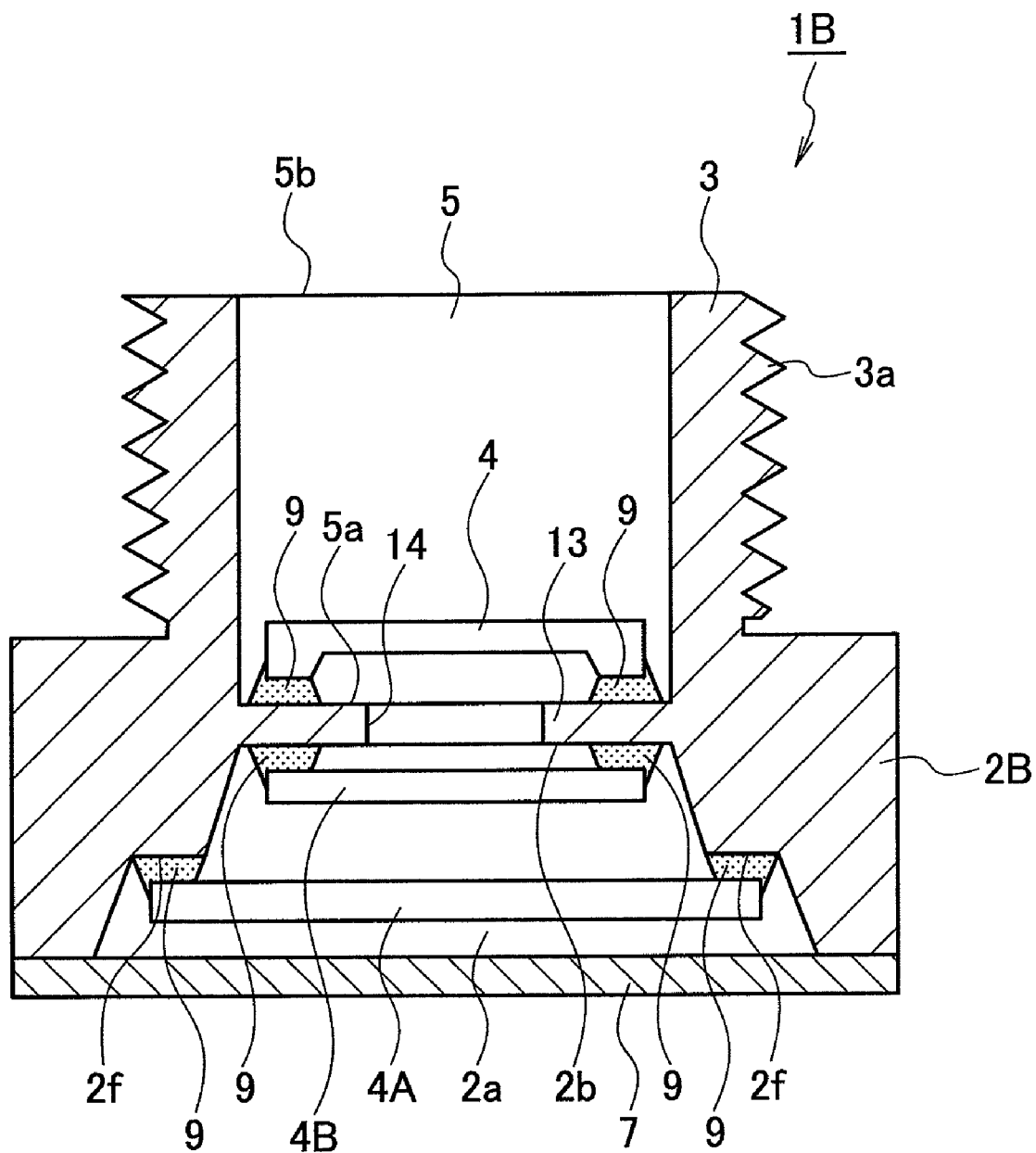
FIG. 8 is a vertical sectional view of a pressure sensor according to a third embodiment of the present invention.

FIG. 8 is a vertical sectional view of a pressure sensor according to a third embodiment of the present invention (sectional view corresponding to FIG. 3). A pressure sensor 1B according to the present embodiment has same constituent elements as those of the pressure sensor 1 or 1A of the first or second embodiment. Therefore, the same constituent elements are denoted by common reference numerals, and redundant explanations thereof will be omitted.

In the present embodiment, an annular flange portion 13 protruding from an inner peripheral surface of the through hole 5 of a base portion 2B toward a center of the through hole 5 is formed. The pressure detecting element 4 is mounted on a surface 5a of the flange portion 13 on the side of a pressure introducing opening 5b of the through hole 5 by flip-chip bonding. Another element 4B that is different from the pressure detecting element 4 (i.e., an element including a circuit that processes (i.e., filters, corrects, calculates) a signal output from the pressure detecting element 4) is mounted on a surface (the bottom face 2b) of the flange portion 13 on the side opposite from the pressure introducing opening 5b.

A conductive pattern (not shown in FIG. 8) that is conducting with the pressure detecting element 4 is formed on an inner end edge (inner peripheral surface) 14 of the flange portion 13, and the conductive pattern is connected to a conductive pattern in the recess 2a (like the conductive patterns 6 shown in FIGS. 2 to 5).

In the present embodiment, almost like in the second embodiment, the stepped recess 2a having the bottom face 2b and the step face 2f formed substantially at a central portion in the depth direction is formed on the base portion 2B. Another element 4A that is different from the pressure detecting element 4 and the element 4B is mounted on the step face 2f.

According to this configuration, the pressure detecting element 4 and the other elements 4A and 4B are mounted on the base portion 2B at distances from one another substantially in parallel to each other. With this configuration, the plurality of elements 4, 4A, and 4B can efficiently be collected in one pressure sensor 1A. Thus, the circuit including these plural elements 4, 4A, and 4B can be constituted more compactly.

Particularly, the pressure detecting element 4 and the other element 4B can efficiently be mounted in multiple steps, utilizing the flange portion 13 provided on the through hole 5, and the pressure sensor 1B having the plural elements 4 and 4B can be constituted more compactly.

Fourth Embodiment

Figure 9:
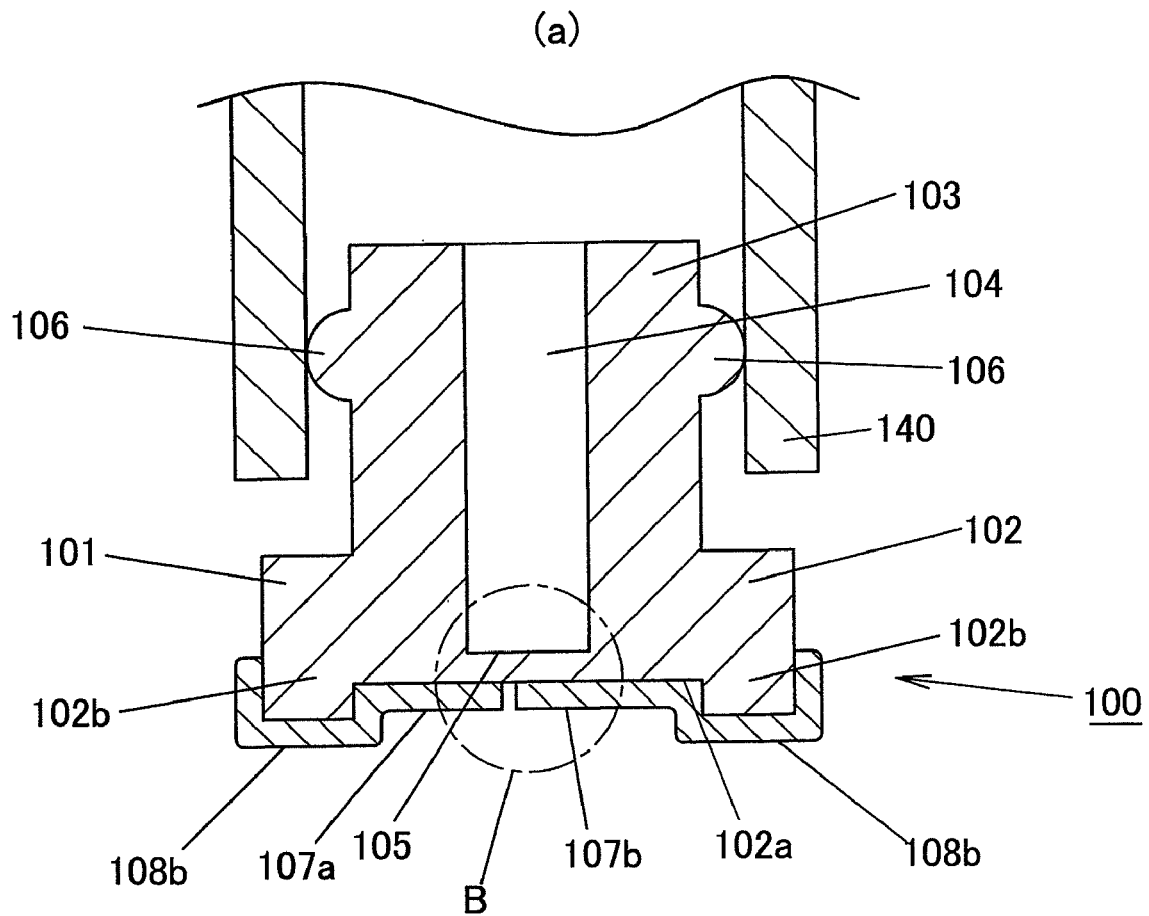
FIG. 9 show a pressure sensor according to a fourth embodiment of the present invention, where 9(a) is a schematic sectional view and 9(b) is an enlarged view of relevant parts of a portion B as viewed from below.
Figure 9:
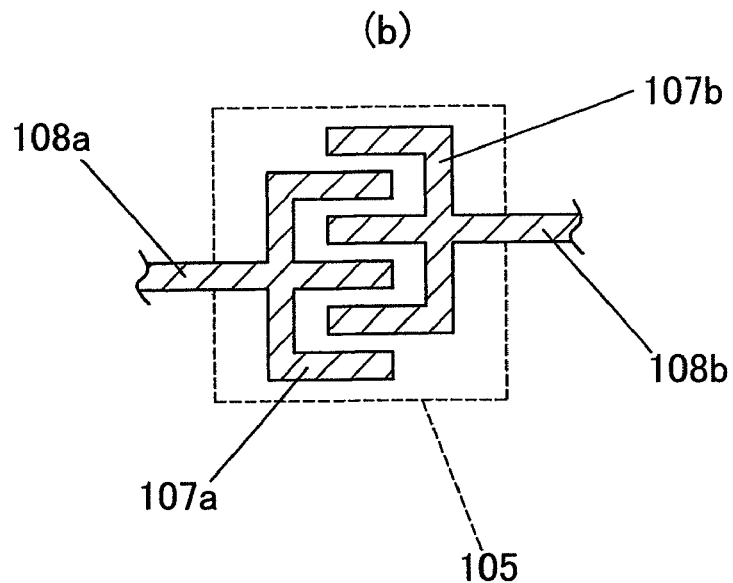

A pressure sensor according to a fourth embodiment of the present invention will be explained with reference to FIGS. 9 to 12. FIG. 9(a) is a sectional view of relevant parts of a pressure sensor 100. The pressure sensor 100 includes a body portion 101 made of a material having elasticity and insulation (resin material such as polyimide), and formed using a technique of producing a molded interconnect device (described later).

The body portion 101 is integrally provided with a rectangular parallelepiped body 102 formed at its lower surface central portion with a recess 102a, and a pressure introducing tube 103 projecting from an upper surface of the body 102. The pressure introducing tube 103 is a hollow cylinder, and a pressure introducing hole 104 is formed at the center of the pressure introducing tube 103. The pressure introducing hole 104 is formed up to a portion near a ceiling of the recess 102a. A thin film portion (diaphragm) 105 is formed on a bottom of the pressure introducing hole 104.

FIG. 9(b) is an enlarged view of relevant parts when a portion B in FIG. 9(a) is viewed from below. Comb-like first electrode pattern 107a and second electrode pattern 107b are formed on a surface of the thin film portion 105 (surface opposite from the pressure introducing hole 104). Both the electrode patterns 107a and 107b include metal plated layers formed on the surface of the thin film portion 105, and are opposed to each other at a distance from each other. Circuit patterns 108a and 108b including metal plated layers are formed on a surface of the body portion 101 where both the electrode patterns 107a and 107b are formed. The circuit patterns 108a and 108b are electrically connected to the electrode patterns 107a and 107b, respectively. The circuit patterns 108a and 108b extend to left and right side surfaces through steps 102b and 102b on both sides of the recess 102a. Portions of the circuit patterns 108a and 108b formed on the steps 102b and 102b are terminals to be soldered to a mounting substrate (not shown).

The pressure introducing tube 103 is inserted into a detection tube 140 that introduces fluid to be detected into the pressure introducing tube 103 from outside. A projection 106 is integrally formed on an outer peripheral surface of the pressure introducing tube 103. The projection 106 elastically comes into contact with an inner surface of the detection tube 140 to seal a gap with the detection tube 140.

The pressure sensor 100 according to the present embodiment has the configuration described above. When a pressure of fluid introduced into the pressure introducing hole 104 is varied, the thin film portion 105 is deformed according to the pressure variation, and a distance between the first electrode pattern 107a and the second electrode pattern 107b is varied according to the deformation. Therefore, the pressure variation of the fluid can be detected from variation in capacitance between the electrode patterns 107a and 107b. When the body portion 101 is made of a conductive material such as silicon, it is preferable that the body portion 101 be made of an insulation material because it is necessary to form an insulation layer between the electrode patterns 107a and 107b and the body portion 101. In this case, piezoresistance cannot be used for the pressure detector; however, the pressure variation of the fluid can be detected from variation in capacitance between the electrode patterns 107a and 107b because a capacitance pressure detector including the first electrode pattern 107a and the second electrode pattern 107b is used in the present embodiment. Further, the capacitance pressure detector has high sensitivity as compared with a pressure detector using gauge resistance, and can detect a pressure of fluid accurately.

The body portion 101 of the pressure sensor 100 is made of an elastic material using the technique of producing the molded interconnect device. The thin film portion 105 is integrally formed on the body portion 101 at the bottom of the pressure introducing hole 104. The body portion 101 is also formed with the first electrode pattern 107a and the second electrode pattern 107b as the pressure detector that convert the deformation of the thin film portion 105 into an electric signal. Therefore, the number of parts of the pressure sensor 100 can be reduced, and the small and inexpensive pressure sensor 100 can be realized. In addition, because the projection 106 provided on the outer surface of the pressure introducing tube 103 has a function for sealing the gap between the pressure introducing tube 103 and the detection tube 140, it is unnecessary to separately provide a seal member such as an O-ring, and the number of parts can be further reduced. To enhance the sealing performance of the projection 106, it is preferable that a material having high elastic modulus such as rubber be used as a material of the body portion 101.

Further, the circuit patterns 108a and 108b are formed on the surface of the body portion 101 where both the electrode patterns 107a and 107b are formed, and the circuit patterns 108a and 108b can be formed at the same time in a step for forming both the circuit patterns 108a and 108b. Therefore, the number of producing steps can be reduced, and the producing costs can be reduced.

In the pressure sensor 100 according to the present embodiment, the body portion 101 is made of a material having elasticity and insulation; however the body portion 101 can be made of an elastic and conductive metal material. In such a case, it is necessary to form an insulation layer made of polyimide, or the like, between the body portion 101, and the conductive patterns 7a, 7b and the circuit patterns 108a, 108b. Such an insulation layer can be formed on the surface of the body portion 101 by deposition or application.

The body portion 101 is formed using the technique of producing the molded interconnect device, which will be explained with reference to FIGS. 10 to 12. A case that the body portion 101 is made of an elastic and conductive metal material is explained below.

Figure 10:
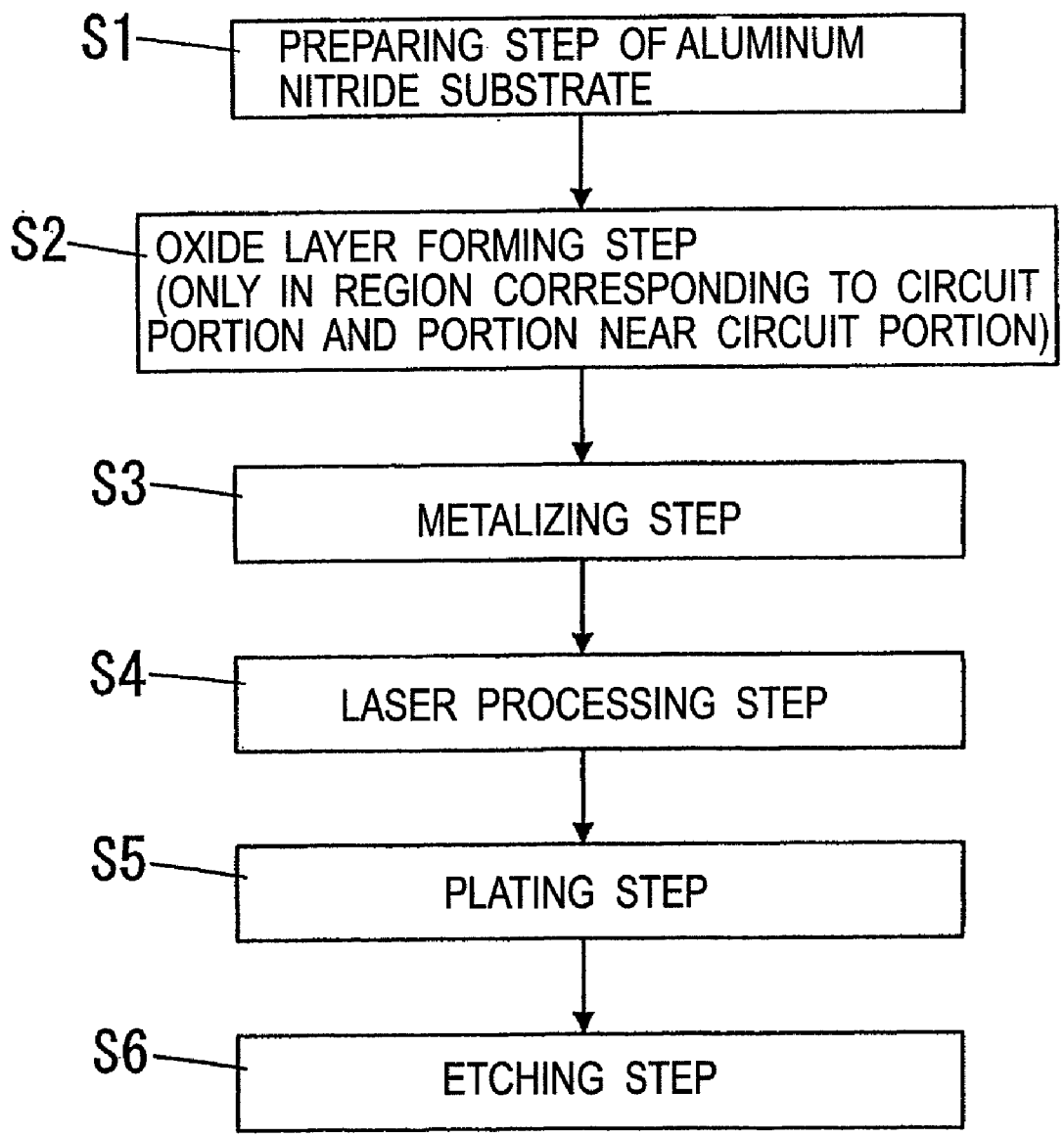
FIG. 10 is a flowchart showing an outline of a producing method according to the fourth embodiment of the present invention.
Figure 11:
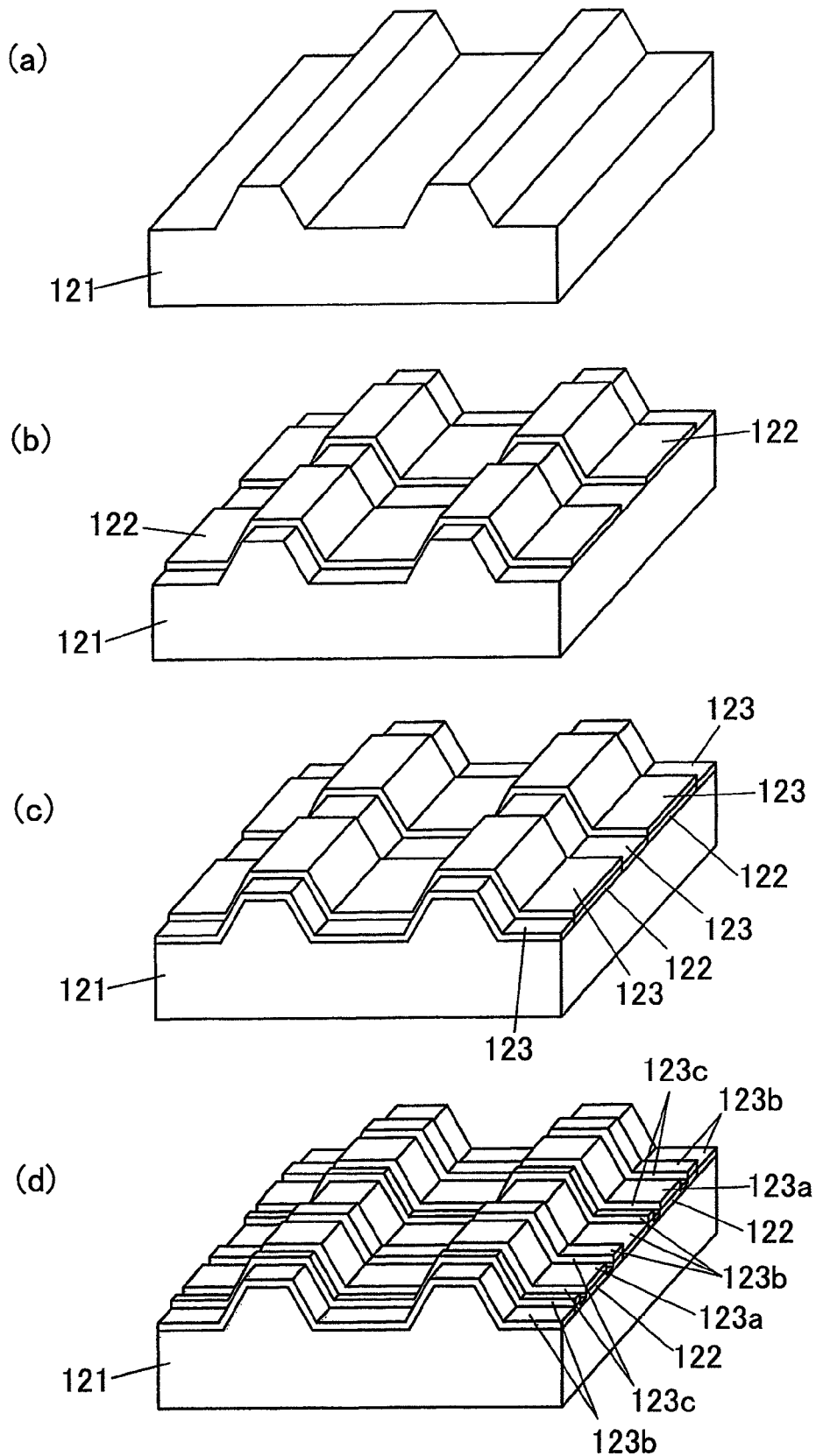
FIGS. 11(a) to 11(d) are perspective views showing surface processing in steps according to the fourth embodiment of the present invention.

FIG. 10 is a flowchart showing an outline of the method for producing the molded interconnect device. The molded interconnect device is produced by sequentially carrying out the following steps: a step (S1) of preparing an aluminum nitride substrate 121 in which an aluminum nitride powder material is molded and sintered, an oxide layer forming step (S2) in which the aluminum nitride substrate 121 is heated, and its surface is oxidized to form an oxide layer 122 (insulation layer), a metalizing step (S3) of forming a conductive thin film 123 on the oxide layer 122 by a physical vapor deposition method such as sputtering, deposition, or ion plating, a laser processing step (S4) of separating a circuit portion/non-circuit portion by high-energy beams (laser beams in the present embodiment), a plating step (S5) of thickening the circuit portion by plating to form a plated layer 124, and a step (S6) of etching the non-circuit portion.

FIGS. 11(a) to 11(d) and FIGS. 12(a) and 12(b) show the surface processing of a molded interconnect device C in the above steps. First, FIG. 11(a) shows the preparing step (S1) for the aluminum nitride substrate 121, in which the aluminum nitride substrate 121 is formed by powder molding and sintering. Aluminum nitride powder which is a raw material used for forming the aluminum nitride substrate is produced using a reducing nitriding method, a direct nitriding method, or a vapor phase composition method. The producing method of a substrate material is not particularly limited here. Because the aluminum nitride is a sintering resistant material, yttria (Y2O3) or calcia (CaO) can be added to the raw material as a sintering agent.

Further, as a method for molding the aluminum nitride powder into a three-dimensional shape, it is possible to use compressing molding, extrusion molding, injection molding, and tape molding, which are used for normally molding a ceramics, and the body portion 101 of a desired three-dimensional shape can be obtained. To obtain the three-dimensional shape, the injection molding is preferably used. Depending upon the molding methods, an organic matter such as organic solvent or resin can be added to provide the raw material with flowability or plasticity.

After the raw material is molded, degreasing is carried out as required to remove the organic matter included in the molded product. In the degreasing step, the temperature is gradually increased from the room temperature to about 600° C., and the organic matter included in the molded product is eluted. The degreasing can be performed in an air atmosphere or inert gas atmosphere such as nitrogen.

The molded product is then sintered, thereby obtaining a three-dimensional aluminum nitride substrate 121 as a dense sintered body. This sintering step is carried out by replacing the atmosphere by inert gas such as nitrogen, and gradually increasing the temperature to about 180° C. If the sintering is carried out in the air, alumina is deposited on a grain boundary of the aluminum nitride. Thus, not only the sintering speed is reduced but also components other than aluminum nitride are mixed, and thermal conductivity of the sintered body is also deteriorated. Hence, it is necessary to sinter the aluminum nitride under the inert atmosphere such as nitrogen. The producing method of the substrate 121 is not limited to the above method, and insulative synthetic resin can be molded.

Next, FIG. 11(b) shows the oxide layer forming step (S2). The surface of the aluminum nitride substrate 121 obtained in the step (S1) is oxidized to form the oxide layer 122 to maintain high insulation after it is irradiated with high-energy beams in the laser processing step (S4). At that time, according to the present invention, the oxide layer 122 is formed in a region corresponding to a circuit portion 123a (which is described later) in the conductive thin film 123 and a portion near the circuit portion 123a, more specifically, in a region that is opposed to the circuit portion 123a and that is greater than the circuit portion 123a by a predetermined width.

As the oxidizing processing for forming the oxide layer 122, the heating processing in the air is carried out. In this method, the temperature of the aluminum nitride substrate material is increased by about 100° C. every hour from the room temperature up to 1000° C., and then, the temperature is maintained at 1000° C. for several hours to several tens of hours, and an thin and insulative oxide layer 122 is formed on the surface of the aluminum nitride substrate material. When the processing is carried out in pressurized vapor instead of in the air, the oxidizing processing can be carried out at a lower temperature for shorter time as compared with the case where the processing is carried out in the air. The forming method of the oxide layer 122 is not limited to the oxidizing processing by heating, and other film-forming method, such as a chemical-vapor deposition method (CVD method) or a sputtering method can be used. When these methods are compared with each other, the film thickness management is the easiest in the heating processing in the air.

Next, FIG. 11(c) shows the metalizing step (S3). For example, the conductive thin film 123 is formed on the aluminum nitride substrate 121 and the oxide layer 122 by the physical vapor deposition method (PVD method) such as the sputtering using copper as a target, the vacuum deposition, and the ion plating. However, the method is not limited to the physical vapor deposition method, and other method such as the chemical-vapor deposition method can be carried out. A single metal such as nickel, gold, aluminum, titanium, molybdenum, chromium tungsten, tin, and lead, or alloy such as brass and NiCr can be employed for the conductive thin film 23, other than copper.

FIG. 11(d) shows the laser processing step (S4). A boundary between the circuit portion 123a and the non-circuit portion 123b in the conductive thin film 123 is irradiated with high-energy beams, i.e., laser beams which are electromagnetic wave beams. The conductive thin film 123 in that portion is evaporated and removed, the circuit portion 123a and the non-circuit portion 123b are separated from each other by the removed portion 123c, and a predetermined circuit pattern is formed. At that time, the width of the oxide layer 122 is wider than a total width of the circuit portion 123*a* and the removed portion 123*c*, the laser beams having passed through the conductive thin film 123 surely collide against the oxide layer 122, and the laser beams do not collide directly against the surface of the aluminum nitride substrate 121.

Figure 12:
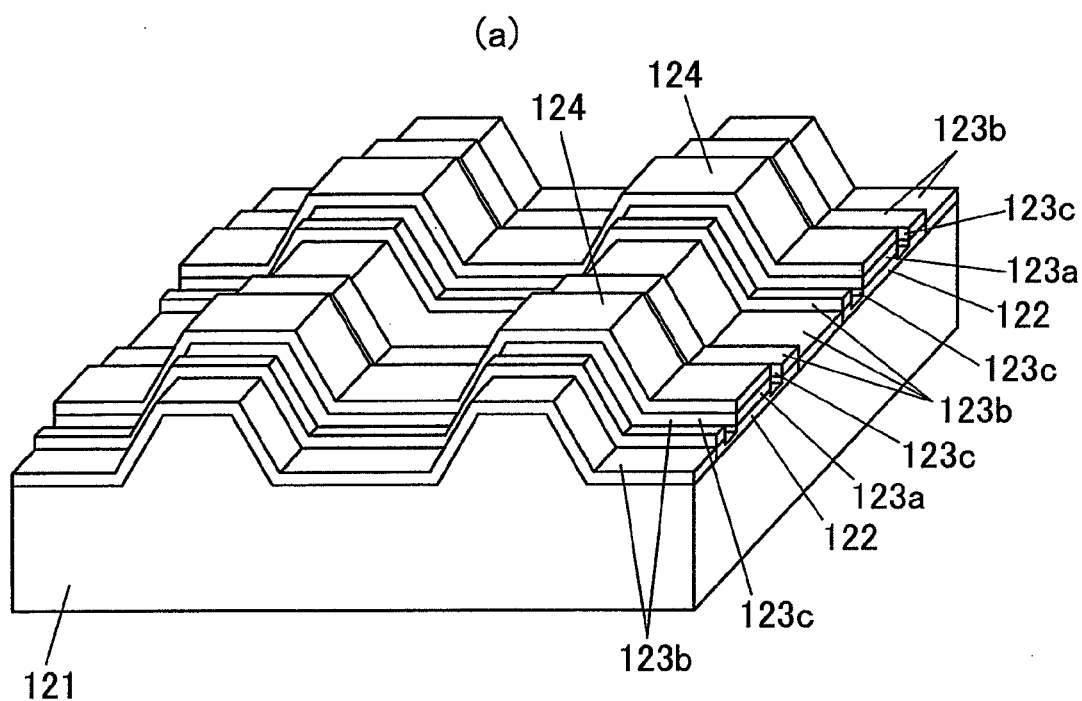
FIGS. 12(a) and 12(b) are perspective views showing the surface processing in the steps according to the fourth embodiment of the present invention.
Figure 12:
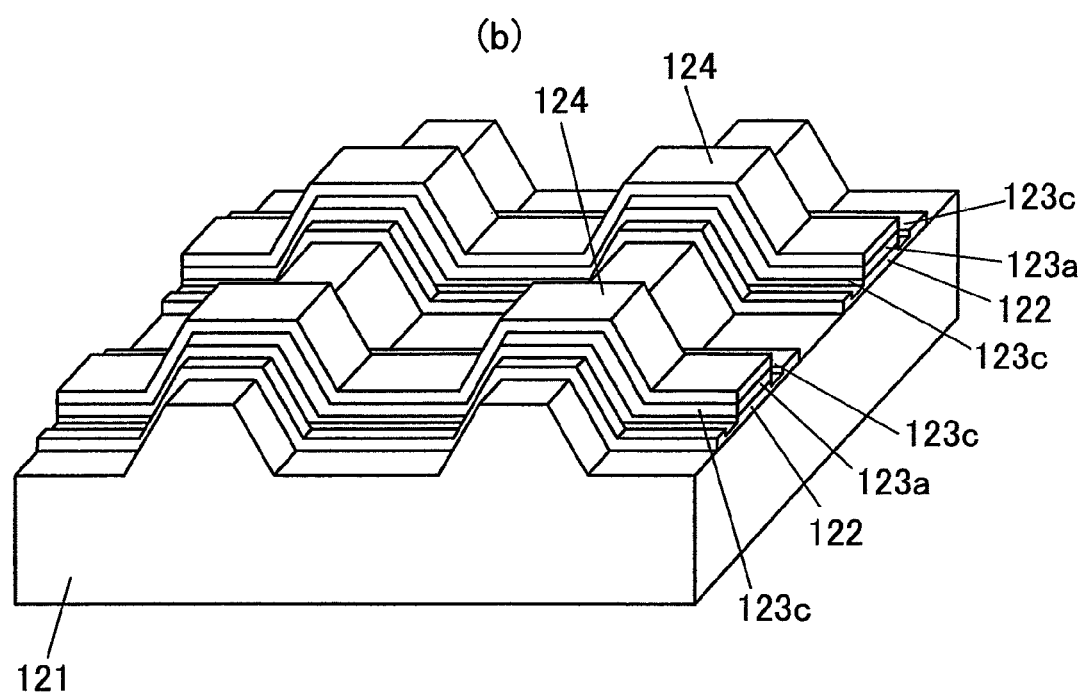

Next, FIG. 12(*a*) shows the plating step (S5). Electricity is supplied to the circuit portion 123*a*, current flows, and the circuit portion 123*a* is thickened by electrolytic copper plating, for example, to form the plated layer 124. At that time, no current flows through the non-circuit portion 123*b*, so that the non-circuit portion 123*b* is not plated and thus the film thickness thereof remains thin.

FIG. 12(*b*) shows the etching step (S6). By etching the entire circuit-pattern forming surface, the non-circuit portion 123*b* is removed such that the ground oxide layer 122 appears, and thus the molded interconnect device formed with the circuit pattern (both the electrode patterns 107*a* and 107*b* and the circuit patterns 108*a* and 108*b*) is completed. Using the producing technique, the body portion 101 can be formed.

In a conventional pressure sensor (for example, see Japanese Patent Application Laid-open No. H8-94468), a sensor chip is fixed to a resin molded body having an insert-molded lead, and an O-ring that seals fluid is mounted on a pressure introducing tube. Therefore, the number of parts of the conventional pressure sensor is high, and there is a problem that the cost and size of the pressure sensor are increased. According to the pressure sensor of the fourth embodiment, the number of parts can be reduced, thereby reducing the size and cost of the pressure sensor. Also according to the present embodiment, a glass pedestal and a wire bonding mounting are unnecessary.

Fifth Embodiment

A fifth embodiment of the present invention will be explained with reference to FIGS. 13 and 14. A pressure sensor according to the present embodiment includes a body portion 201 including a molded interconnect device and provided with a thin diaphragm 210 that is bent when it receives a pressure of fluid, a pressure detector 202 that is formed on a surface of the diaphragm 210 with which no fluid comes into contact (lower surface in FIG. 13(*a*)), and that converts the bending generated in the diaphragm 210 into an electric signal, and a signal processing circuit 204 that is mounted on the body portion 201, that is connected to the pressure detector 202 through a conductive pattern 203 formed on the body portion 201, and that processes the electric signal received from the pressure detector 202 through the conductive pattern 203. In the following description, vertical and lateral directions are defined with reference to FIG. 13(*a*).

The body portion 201 is made of an elastic synthetic resin material, and formed into a flat rectangular box-like shape. The body portion 201 is provided at its central portion with the thin diaphragm 210. A cylindrical fitting portion 212 projects upward from an upper surface of the body portion 201, and fluid comes into contact with the diaphragm 210 through the fitting portion 212. A screw thread 213 is formed on an outer peripheral surface of the fitting portion 212.

Figure 13:
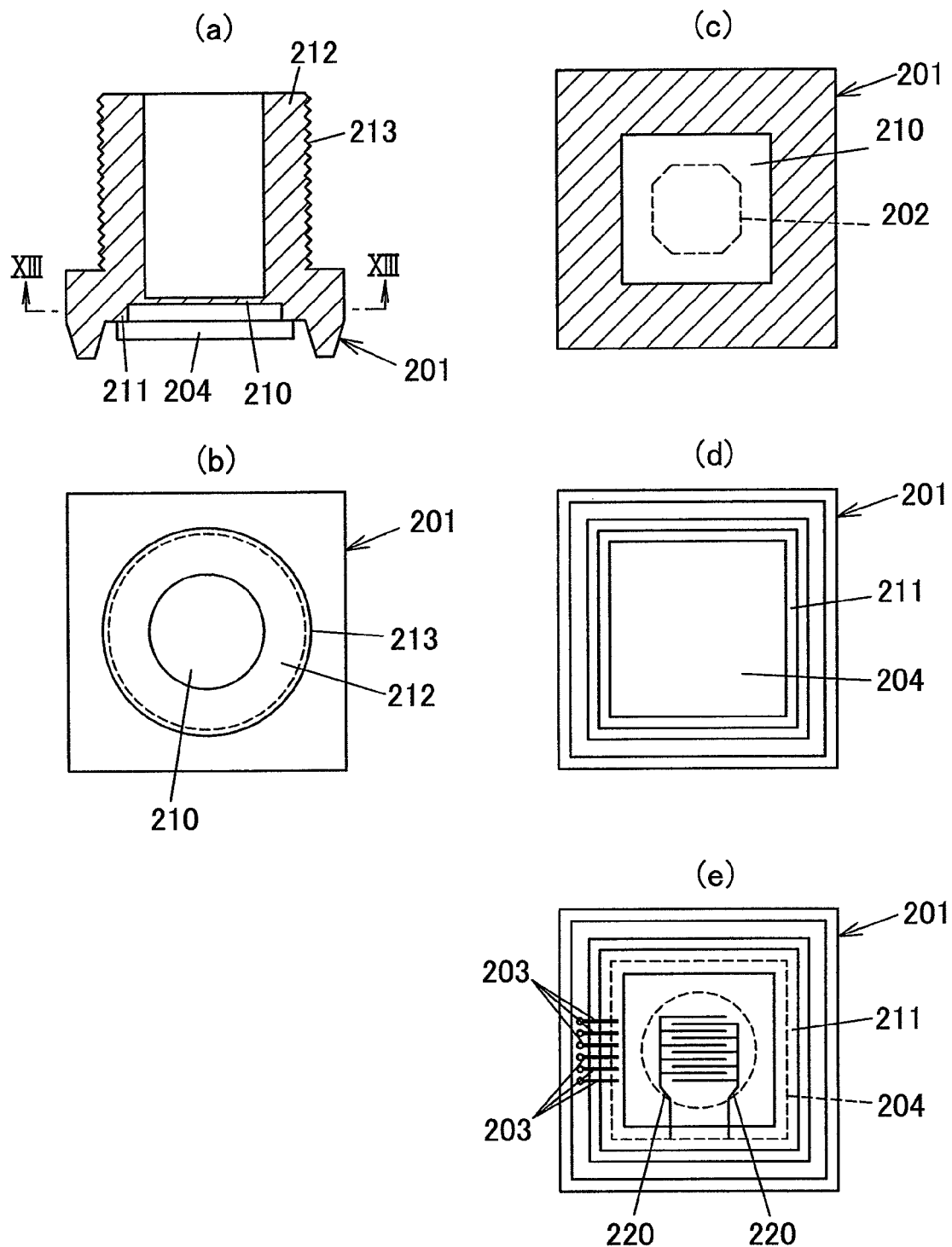
FIG. 13 show a fifth embodiment of the present invention, where 13(a) is a front sectional view, 13(b) is a plan view, 13(c) is a sectional view taken in the direction of the arrows XIII-XIII in 13(a), 13(d) is a bottom view, and 13(e) is a bottom view from which a signal processing circuit is removed.
Figure 14:
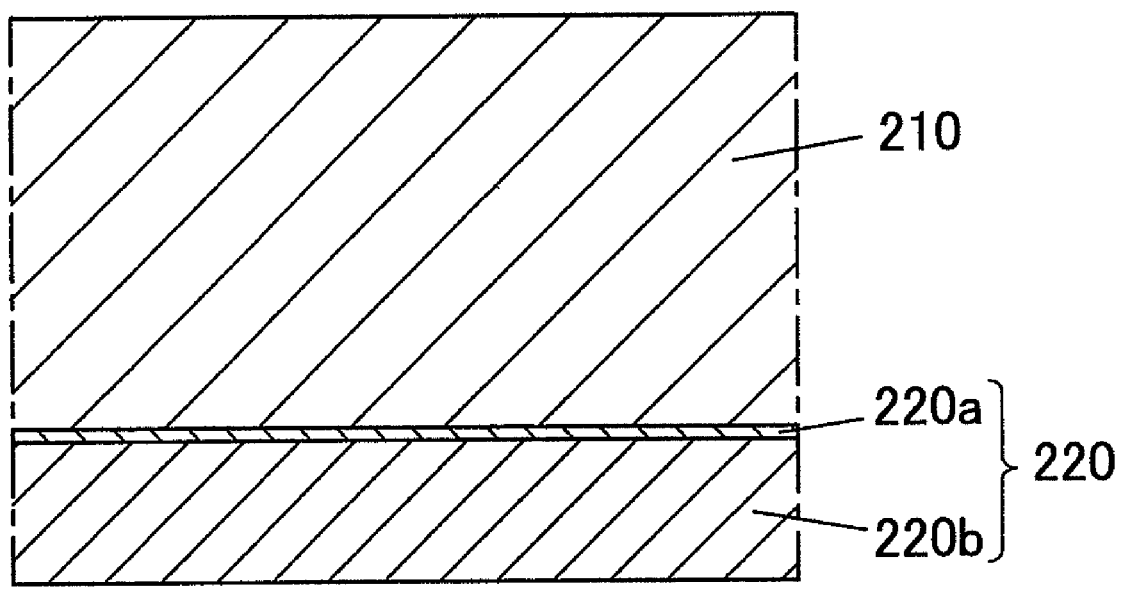
FIG. 14 is a sectional view of relevant parts including a pressure detector according to the fifth embodiment of the present invention.

As shown in FIG. 13(*e*), the pressure detector 202 includes a pair of electrodes 220 and 220 in which teeth of comb-like conductive patterns are opposed to each other. Bending of the diaphragm 210 is converted into variation in capacitance between the electrodes 220 and 220, and an electric signal of a level corresponding to the amount of the variation is output. In the conductive patterns constituting the electrodes 220 and 220, a ground layer 220*a* is formed by sputtering copper on the diaphragm 210 made of a synthetic resin material as shown in FIG. 14, and a conductive layer 220*b* is formed by plating copper on the ground layer 220*a*.

The signal processing circuit 204 outputs a pressure detection signal having a level corresponding to a pressure of fluid by taking the electric signal that is output from the pressure detector 202 and carrying out signal processing such as amplification or waveform shaping. The signal processing circuit 204 includes an integrated circuit (IC), and is mounted on a step 211 provided on a lower surface of the body portion 201. The signal processing circuit 204 is connected to the pressure detector 202 and an external electric wire through the conductive pattern 203 formed on the body portion 201 (see FIG. 13(*e*)).

When fluid to be measured is introduced into the fitting portion 212 and brought into contact with the diaphragm 210, the diaphragm 210 is bent by a pressure of the fluid, the bending of the diaphragm 210 is converted into an electric signal by the pressure detector 202, the electric signal is taken into the signal processing circuit 204, and a pressure detection signal that is processed by the signal processing circuit 204 is output to outside, so that a pressure of the fluid can be detected. According to the present embodiment, the diaphragm 210 that is bent upon receipt of a pressure of fluid is integrally provided on the body portion 201 including the molded interconnect device. Therefore, no fluid leaks from a bonded portion between the sensor chip and the pedestal or from an adhered portion between the pedestal and the body portion, and thus, the pressure detection is not hindered by leakage of fluid, unlike the conventional example.

The body portion 201 can be held by a tube (not shown) through which fluid is introduced, by fitting the fitting portion 212 into the tube. When the screw thread 213 on the outer peripheral surface of the fitting portion 212 is threadedly engage with the screw thread formed on the inner peripheral surface of the tube to strongly couple the fitting portion 212 and the tube with each other, distortion is not generated at a portion other than the diaphragm 210 in the body portion 201, and there is a merit that fluid pressure detection sensitivity is enhanced.

Sixth Embodiment

Figure 15:
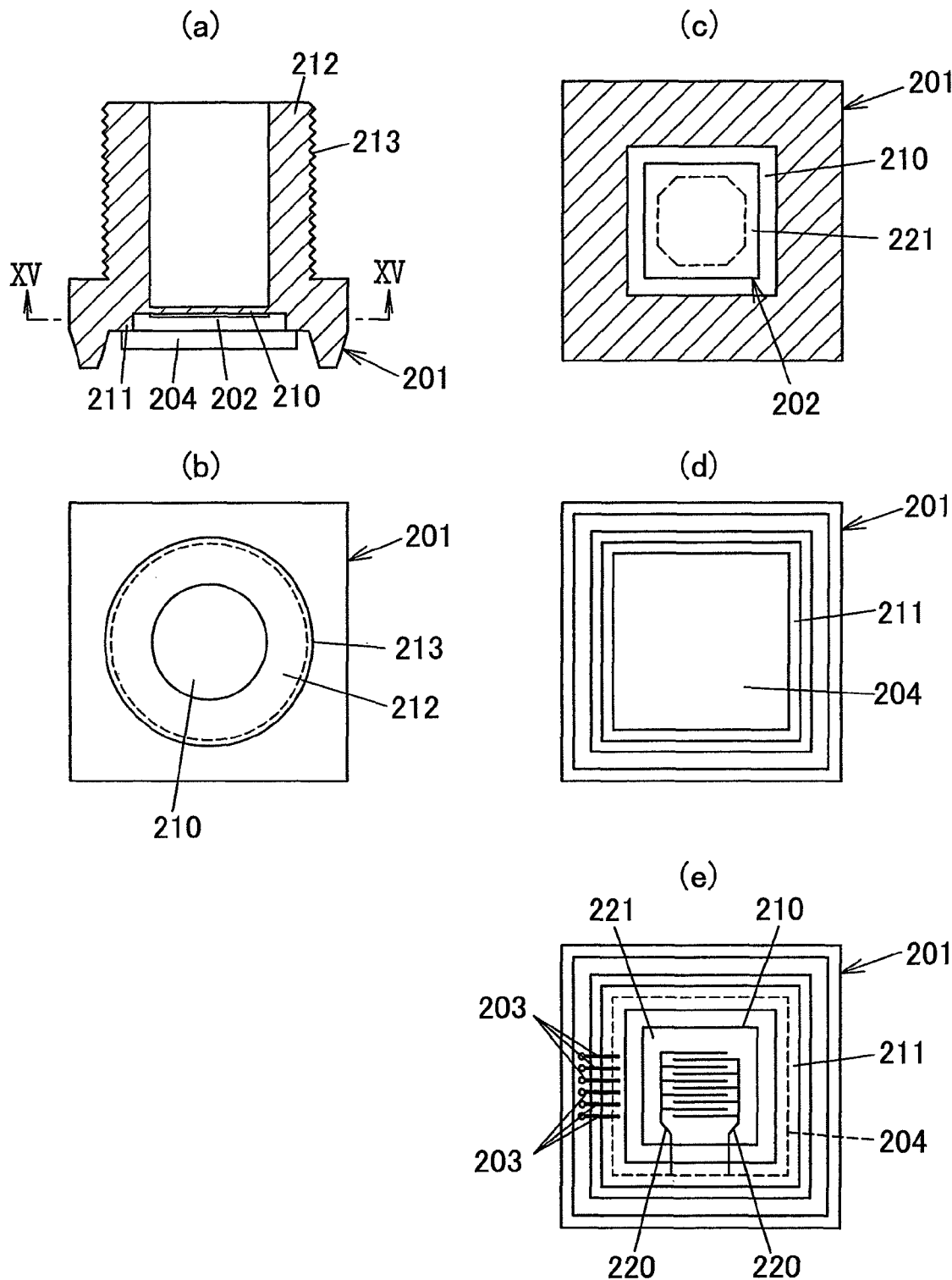
FIG. 15 show a sixth embodiment of the present invention, where 15(a) is a front sectional view, 15(b) is a plan view, 15(c) is a sectional view taken in the direction of the arrows XV-XV in 15(a), 15(d) is a bottom view, and 15(e) is a bottom view from which a signal processing circuit is removed.

A sixth embodiment of the present invention will be explained with reference to FIGS. 15 and 16. The present embodiment is particularly characterized in the configuration of the pressure detector 202, while other configurations are the same as those of the fifth embodiment. Therefore, same constituent elements as those in the fifth embodiment are denoted by common reference numerals, and redundant explanations thereof will be omitted.

Figure 16:
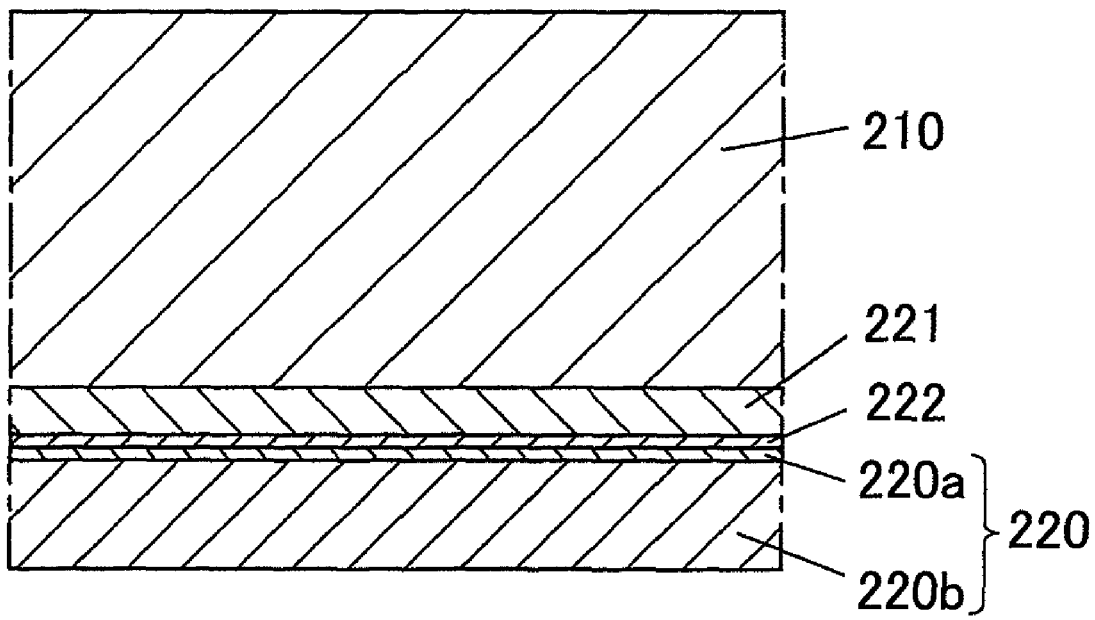
FIG. 16 is a sectional view of relevant parts including a pressure detector according to the sixth embodiment of the present invention.

As shown in FIG. 16, according to the pressure detector 202 of the present embodiment, a dielectric film 221 is formed on the surface of the diaphragm 210, and the electrodes 220 and 220 are formed on the dielectric film 221. A chromium layer 222 is formed between the dielectric film 221 and the electrodes 220 and 220 by sputtering.

In the present embodiment, the pressure detector 202 includes the dielectric film 221 formed on the surface of the diaphragm 210, and the comb-like electrodes 220 and 220 formed on the dielectric film 221. Therefore, as compared with the fifth embodiment having no dielectric film 221, capacitance variation between the electrodes 220 and 220 with respect to the bending of the diaphragm 210 of the same level is largely increased, and as a result, the sensitivity of the pressure detector 202 is enhanced.

The dielectric film (piezoelectric body film) 221 can be formed by a material having high dielectricity (e.g., piezoelectric body such as lead zirconate titanate (PZT)). The piezoelectric body film 221 is formed by forming a film on the surface of the diaphragm 210 by an aerosol deposition method using fine powder of a piezoelectric body, adding an electric field thereto, and orienting the same. In the configuration having the piezoelectric body film 221, when the diaphragm 210 is bent by a pressure of fluid, voltage corresponding to a bending amount (magnitude of the pressure) is generated in the piezoelectric body film 221 formed on the surface of the diaphragm 210. This voltage is taken out through the comb-like electrodes 220 and 220, and thus the pressure of fluid can be converted into an electric signal.

Figure 17:
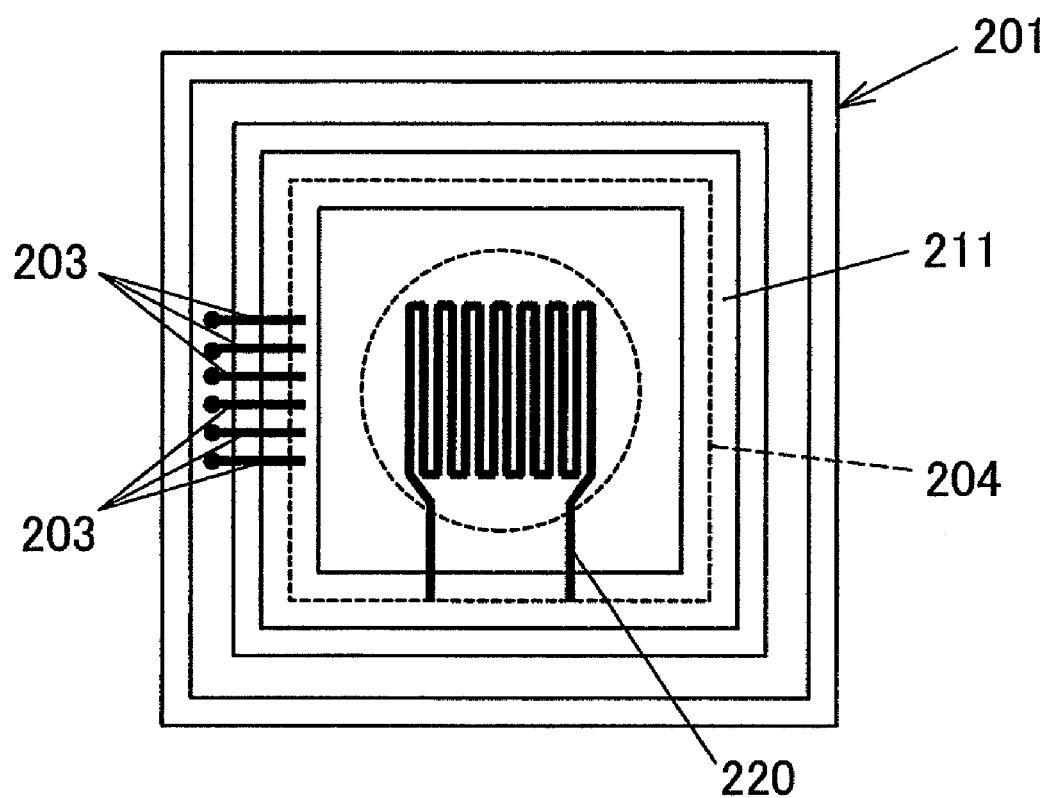
FIG. 17 is a bottom view of a pressure detector having another configuration in the sixth embodiment of the invention, from which a signal processing circuit is removed.

When the electrode 220 formed on the surface of the diaphragm 210 is made of a distortion sensitive material (a material whose resistance is varied if distorted, e.g., Ni—Cu (nickel-copper) or Ni—Cr (chrominum nitride)), the bending amount of the diaphragm 210 can be taken out as a variation amount of electric resistance of the electrode 220. The electrode 220 in this case is formed into a meandering shape from one end to the other end as shown in FIG. 17, and the meandering portion is a strain gauge made of the distortion sensitive material.

In the conventional configurations (for example, Japanese Patent Applications Laid-open Nos. 2003-133453 and H10-300604), there is a concern that fluid leaks from a bonded portion between the sensor chip and the pedestal or from an adhered portion between the pedestal and the body portion, and if fluid leaks, there is a problem that the pressure detection is hindered (or the pressure cannot be detected). According to the fifth and sixth embodiments, it is possible to obtain a pressure sensor in which pressure detection is not hindered by leakage of fluid. Also according to the fifth and sixth embodiments, a glass pedestal and a wire bonding mounting are unnecessary.

While preferred embodiments of the present invention have been explained above, the present invention is not limited thereto and various modifications can be made.

INDUSTRIAL APPLICABILITY

The present invention can be utilized as a pressure sensor that detects a pressure of fluid.

The invention claimed is:

1. A pressure sensor, comprising:
a body portion having a through hole; and
a pressure detecting element provided in a position to close the through hole,
wherein the body portion is a molded interconnect device in which ceramic is molded into a predetermined shape and a conductive pattern is formed on a surface of the body portion.

2. The pressure sensor according to claim 1, wherein the pressure detecting element is mounted on the body portion by flip-chip bonding.

3. A pressure sensor, comprising:
a body portion having a through hole; and
a pressure detecting element mounted on the body portion by flip-chip bonding at a position to close the through hole,
wherein the body portion is a molded interconnect device in which an insulative resin material is molded into a predetermined shape and a conductive pattern is formed on a surface of the body portion.

4. The pressure sensor according to claim 1, wherein the pressure detecting element and another element that is different from the pressure detecting element are mounted on the body portion substantially in parallel to and at a distance from each other.

5. The pressure sensor according to claim 4, wherein a recess having a bottom face and a step face is formed in the body portion, the through hole is formed such that it opens at the bottom face,
the pressure detecting element is mounted on the bottom face, and the other element is mounted on the step face.

6. The pressure sensor according to claim 1, wherein a recess is formed in the body portion, the through hole is formed such that it opens at a bottom face of the recess,
the pressure detecting element is mounted on the bottom face, and
the conductive pattern is formed to connect an inner surface of the recess and a side wall surface of the body portion across an opening edge of the recess.

7. The pressure sensor according to claim 5, wherein the recess is vacuum sealed.

8. The pressure sensor according to claim 4, wherein
a flange portion protruding from an inner peripheral surface of the through hole toward a center of the through hole is formed on the body portion,
the pressure detecting element is mounted on a surface of the flange portion on a side of a pressure introducing opening of the through hole, and
the other element is mounted on a surface of the flange portion opposite from the pressure introducing opening.

9. A pressure sensor that is made of an elastic material and formed using a technique of producing a molded interconnect device, wherein the pressure sensor is formed with a pressure introducing hole through which fluid to be detected is introduced, the pressure sensor comprising:
a body portion formed with a thin film portion at a bottom of the pressure introducing hole, and
a pressure detector that converts, into an electric signal, deformation of the thin film portion formed on a surface of the body portion and generated according to a pressure variation,
wherein the pressure detector comprises a first electrode pattern and a second electrode pattern formed on a surface of the thin film portion opposite from the pressure introducing hole, the first electrode pattern and the second electrode pattern are separated and opposed to each other, and the pressure detector detects a pressure variation by detecting a capacitance variation between the first and second electrode patterns.

10. The pressure sensor according to claim 9, wherein a circuit pattern is formed on a surface of the body portion where both the electrode patterns are formed, the circuit pattern being electrically connected to the electrode patterns.

11. The pressure sensor according to claim 9, wherein the body portion includes a pressure introducing tube having the pressure introducing hole, and a projection, which elastically comes into contact with an inner surface of a detection tube into which the pressure introducing tube is inserted, is formed on an outer surface of the pressure introducing tube, thereby sealing a gap between the inner surface of the detection tube and the outer surface of the pressure introducing tube.

12. A pressure sensor, comprising:
a body portion constituted as a molded interconnect device and including a thin diaphragm which is bent upon reception of a pressure of fluid, a pressure detector that is formed on a surface of the diaphragm where no fluid comes into contact and that converts bending generated in the diaphragm into an electric signal, and a signal processing circuit that is mounted on the body portion, that is connected to the pressure detector through a conductive pattern formed on the body portion, and that processes the electric signal received from the pressure detector through the conductive pattern, wherein the pressure detector comprises a first electrode pattern and a second electrode pattern formed on a surface of the diaphragm where no fluid comes into contact, the first electrode pattern and the second electrode pattern are separated and opposed to each other, and the pressure detector detects a pressure variation by detecting a capacitance variation between the first and second electrode patterns.

13. The pressure sensor according to claim 12, wherein the pressure detector includes a dielectric film formed on the diaphragm surface, and an electrode formed on the dielectric film.

14. The pressure sensor according to claim 13, wherein the dielectric film is formed of a piezoelectric body.

15. The pressure sensor according to claim 12, wherein the body portion includes a fitting portion that is cylindrical in shape surrounding a diaphragm surface with which fluid comes into contact, and that is fitted to a tube in which fluid is present.

16. The pressure sensor according to claim 15, wherein the fitting portion is cylindrical in shape, and a screw thread is formed on its outer peripheral surface.

* * * * *